INVENTOR.
MASAO TSUDA

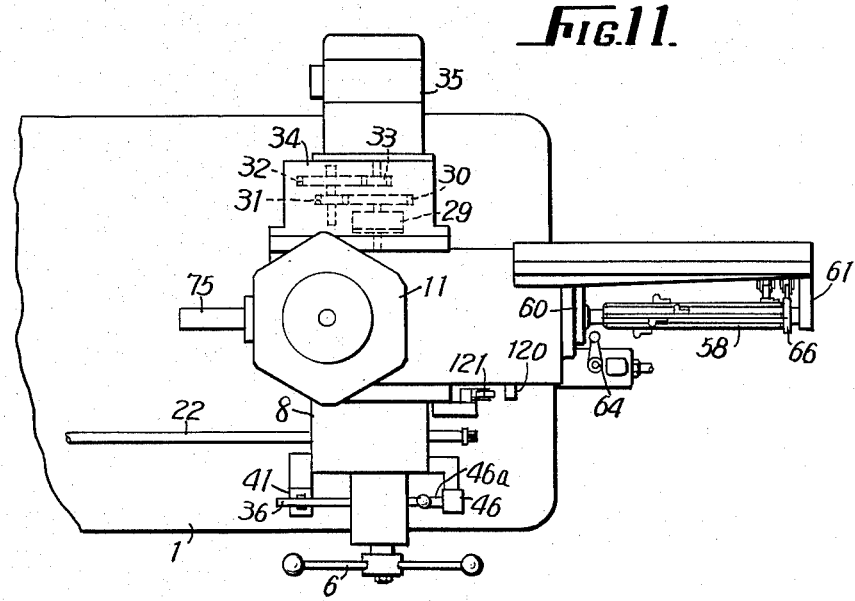
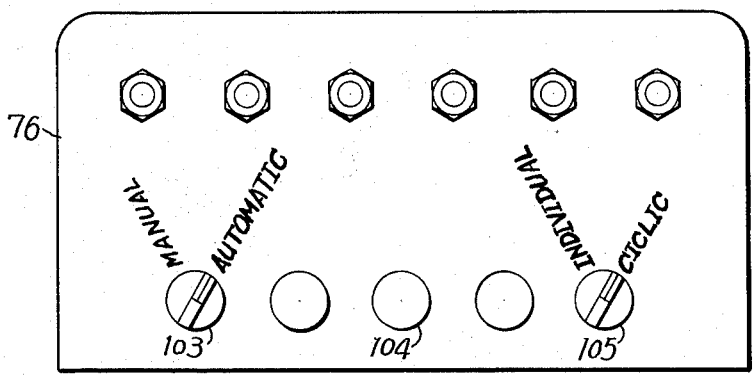

Dec. 7, 1965 MASAO TSUDA 3,221,579
AUTOMATIC CONTROL MECHANISM FOR RAM TYPE TURRET LATHE
Filed April 30, 1963 7 Sheets-Sheet 3
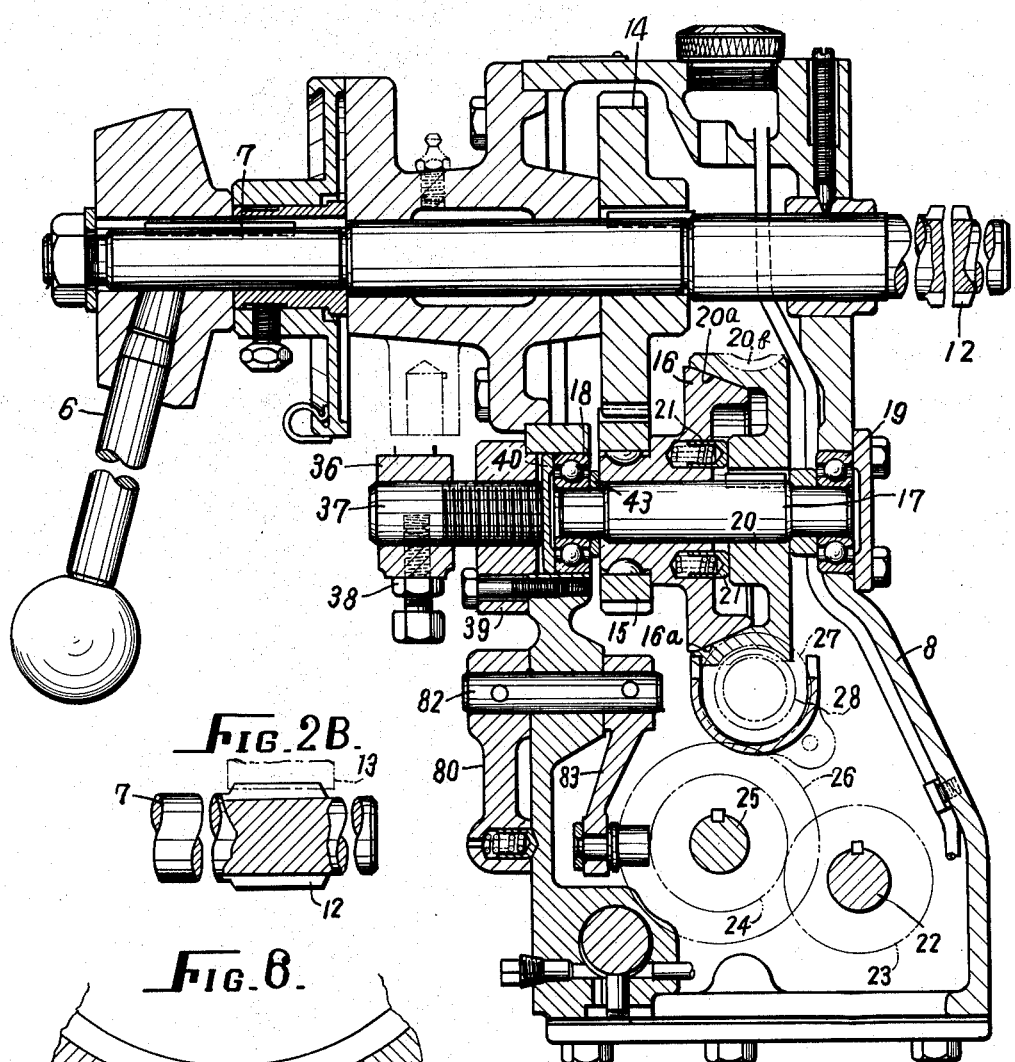
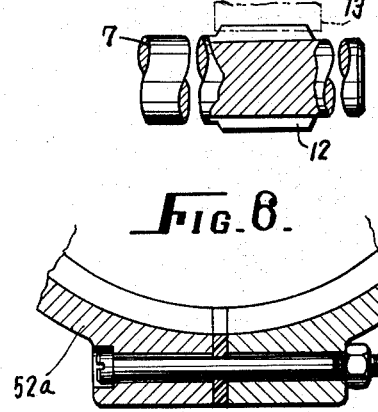
INVENTOR.
MASAO TSUDA

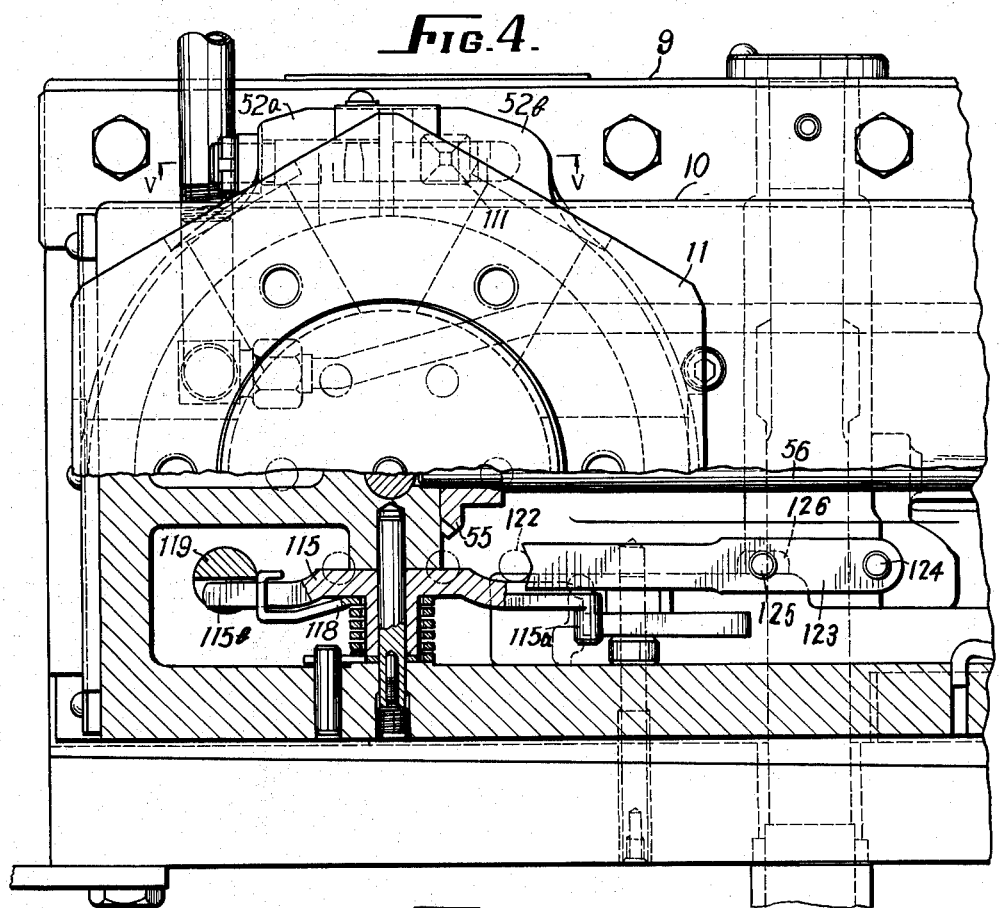
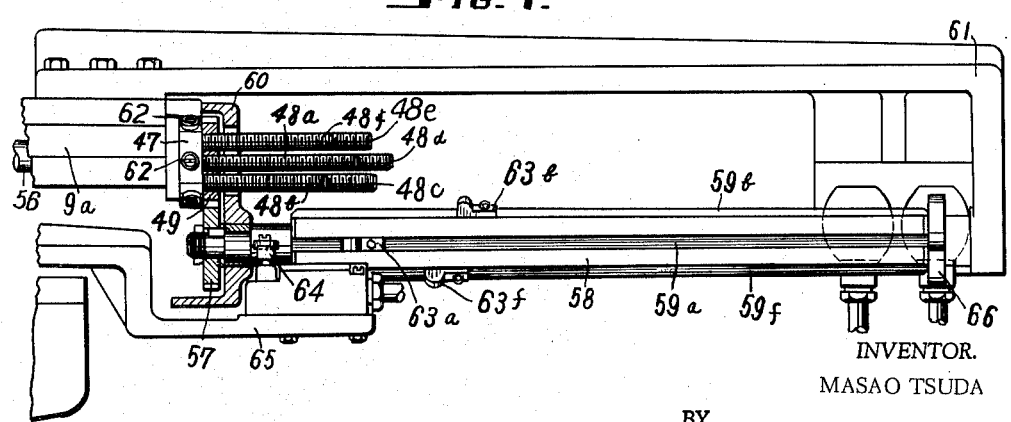

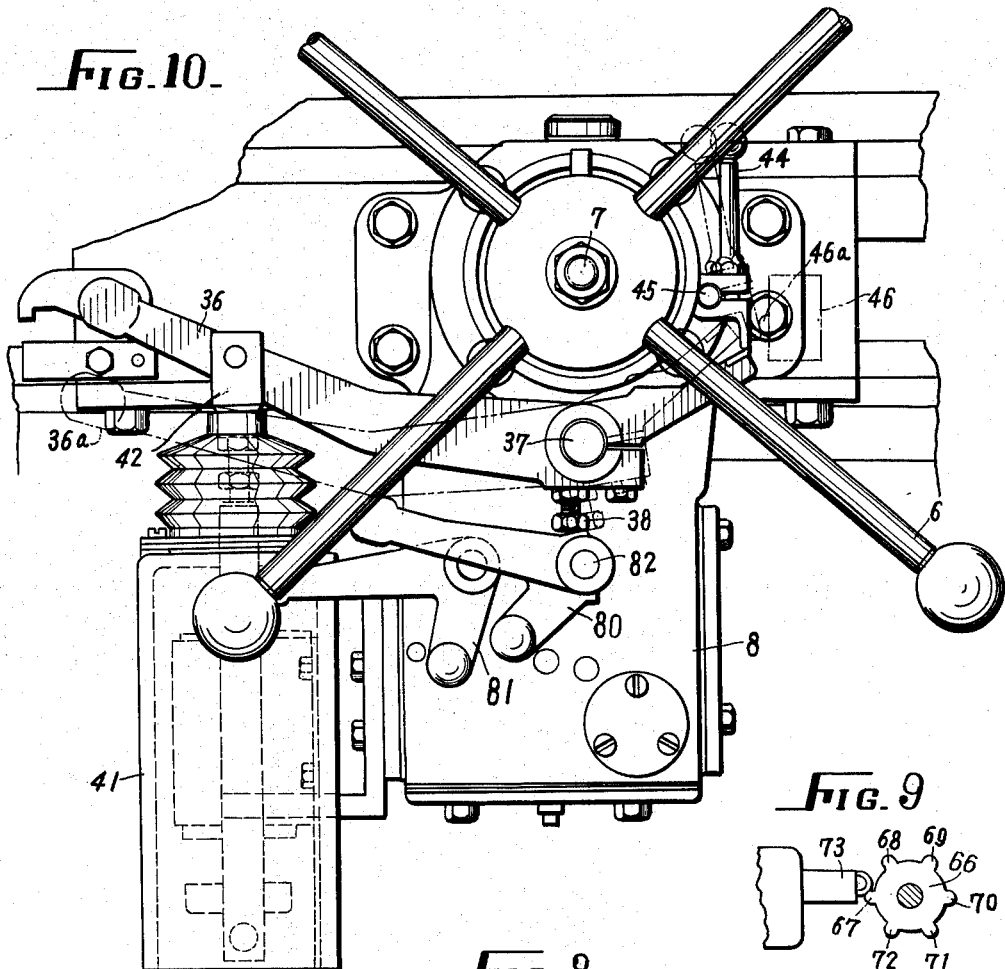
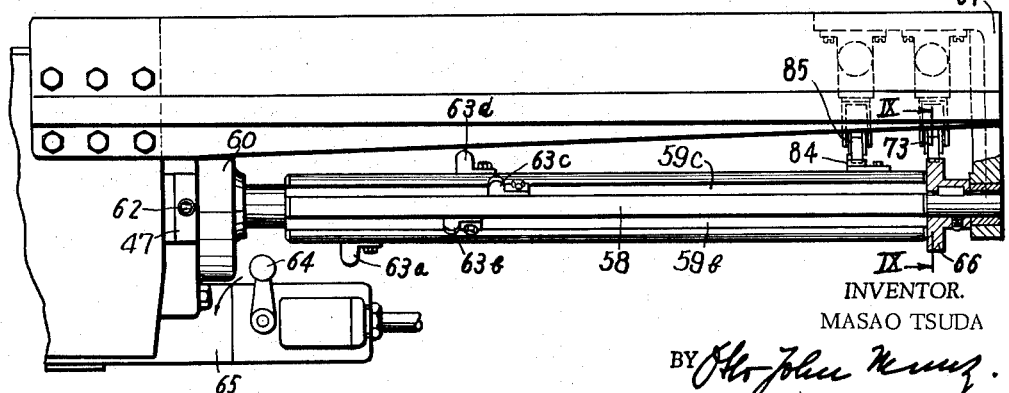

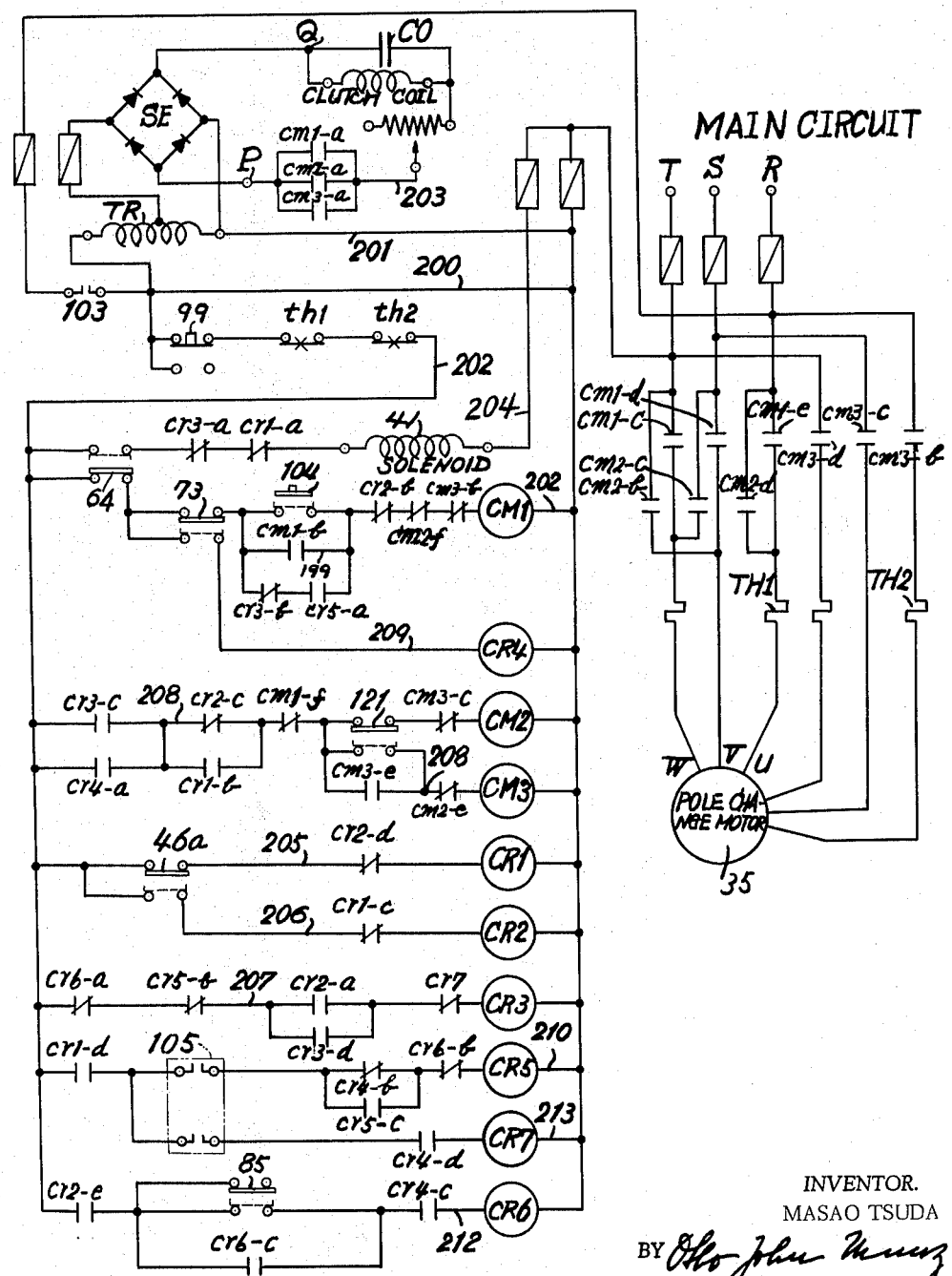

United States Patent Office 3,221,579
Patented Dec. 7, 1965

3,221,579
AUTOMATIC CONTROL MECHANISM FOR
RAM TYPE TURRET LATHE
Masao Tsuda, 38 Sakee-cho, Senju, Adachi-ku,
Tokyo, Japan
Filed Apr. 30, 1963, Ser. No. 276,749
Claims priority, application Japan, Aug. 22, 1962,
37/34,849
1 Claim. (Cl. 82—21)

This invention relates generally to turret lathes. More specifically, it relates to automatic control mechanisms for that kind of machines.

One of the objects of the present invention is to provide a turret machine control mechanism which is highly simple in its design and construction and easy and economical to manufacture.

A further object of the invention is to provide a control mechanism of the kind above referred to, which may constitute substantially an attachment to a conventional turret lathe with a slight modification thereof.

A further object of the invention is to provide a control mechanism of the kind above referred to, which uses substantially mechano-electric switching means, yet none of electronic means, thus providing for the utilization of regular current source commonly employed for conventional and orthodox turret lathes.

A still further object of the invention is to provide a control mechanism of the kind above referred to, which may perform various machining operations automatically, yet with a small number of additional parts to the conventional turret lathe.

With these and other objects in view, this invention consists in the construction, arrangement, and combination of the various parts of the mechanism, whereby the objects contemplated are attained, as hereinafter more fully set forth, pointed out in the claims appended hereto, and illustrated in the accompanying drawings in which:

FIGS. 1A and 1B constitute together a complete drawing illustrating a front view of essential parts of an embodiment of the turret lathe constructed according to the invention;

FIG. 2A represents an enlarged vertical section taken on the line II—II in FIG. 1B, illustrating a conventional star handle together with a gear train cooperating therewith;

FIG. 2B is a similar sectional view complementary to the right-hand part of FIG. 2A;

FIG. 4 is a detailed top plan view of the turret head assembly shown in FIG. 3, wherein however several parts are shown in section;

FIG. 6 is an enlarged detail horizontal section of the connection means for two-part brake band of the turret head;

FIG. 7 is an enlarged front view of the attachment to the machine with its several parts shown in section, said attachment constituting the essential parts of the invention and already shown in FIG. 1B;

FIG. 8 is a top plan view of the attachment shown in FIG. 7, wherein however several parts are shown in section;

FIG. 9 is a cross-section taken on the line IX—IX in FIGS. 7 and 8, respectively;

FIG. 10 is an enlarged detail front view of part of the lathe in the neighborhood of the star handle;

FIG. 11 is a reduced and highly simplified top plan view of the right-hand half of the lathe shown in FIG. 1; and FIG. 12 is a circuit diagram of electrical parts employed.

Figure 1A:
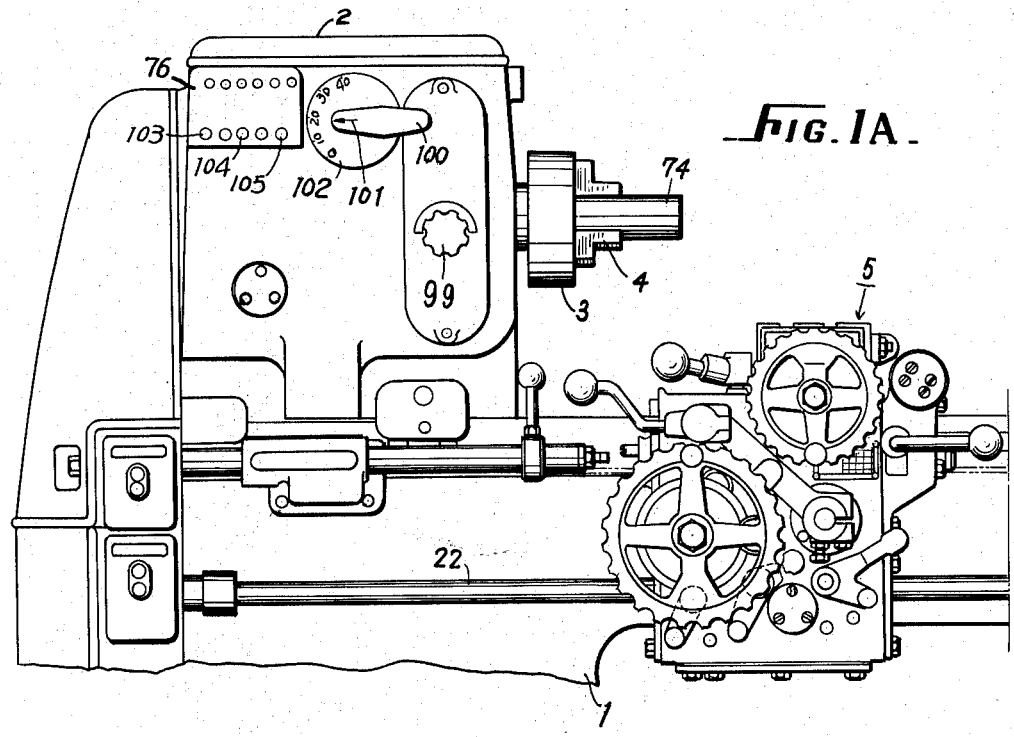
FIG. 1C is an enlarged front view of the switch box shown in FIG. 1A.
Figure 1B:
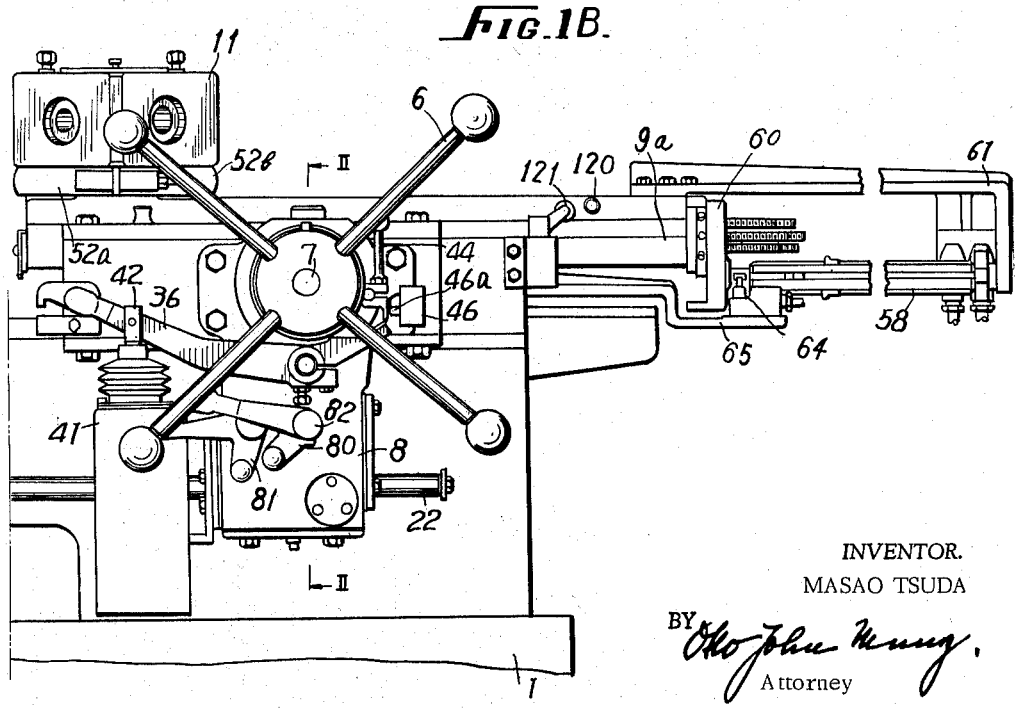

Referring now to the accompanying drawings, especially FIGS. 1A and 1B thereof, 1 denotes a machine bed which is supported as conventionally by a plurality of legs, not shown, on a rigid floor also not shown. A conventional spindle head 2 is fixedly mounted on the right-hand end of the bed 1 and fitted therein with an electric motor and a gearing cooperating therewith for driving a main spindle carrying a chuck 3 provided with a plurality of conventional jaws 4, said motor, gearing and spindle being however not shown. 5 denotes a conventional cross slide which is slidable in the lateral direction on machine bed 1 and arranged so as to be selectively positioned therealong.

A star handle 6 is fixedly mounted on a lateral shaft 7 which is in turn rotatably mounted in a gear box 8. The gear box is fixedly mounted on a conventional saddle 9 (FIG. 4) which is selectively positionable along the machine bed and in turn slidable mounts a ram 10 (FIG. 4) as is conventional. A turret head assembly 11 is mounted rotatably on the ram and can be positioned at any one of six working stations A–F about its vertical axis, as will be more fully described hereinafter.

Star wheel shaft 7 is formed at an intermediate point thereof with a pinion 12 which meshes with a rack 13 diagrammatically illustrated in FIG. 2B. Although not shown, this rack is fixedly attached to the bottom surface of ram 10. Thus, when star handle 6 is turned manually in one direction or another, the ram may be advanced or retarded longitudinally of the machine as is conventional. 14 denotes a gear fixedly mounted on the lateral shaft 7 and is kept in engagement with a pinion 15 which is keyed to a clutch member 16 slidably mounted on clutch shaft 17. There are provided anti-friction bearings 18–19 mounted in gear casing 8 for rotatably mounting the clutch shaft. Clutch member 16 has a cone peripheral surface 16a adapted for operative engagement with the corresponding cone surface 20a of opposite clutch member 20 keyed to shaft 17. Spring-loaded urging means 21 are provided in member 16 so that the both clutch members are normally kept in separation from each other, thus providing the manual advancement or retard of the ram by operation of star handle 6 in the way above explained. In FIG. 2A, however, the two clutch members are shown in their operating or engaging position.

A longitudinal drive shaft 22 (FIGS. 1A and 2A) is arranged alongside the machine bed and operatively connected with the spindle head gearing, although not shown. Thus, when the spindle motor is energized, the drive shaft is caused to rotate at a reduced proper speed.

Shaft 22 is provided with a gear 23, from which rotation may be transmitted through a gear 24, a shaft 25 mounting the latter, and a further gear 26 mounted equally on the shaft, to a gear 27 made integral with a worm 28 which coperates with a worm wheel 20b constituting part of the clutch member 20. Gear 23 is slidable longitudinally along the shaft 22, yet rotatable in unison therewith.

Thus, when both clutch members 16 and 20 are kept in engagement as shown and the spindle motor is energized, motion is transmitted therefrom to the clutch member 16, whereby lateral shaft 7 is caused to rotate through the intermediary of pinion 15 and gear 14. By this rotation of shaft 7, ram 10 may be power driven forwardly or rearwardly, as the case may be, at a relatively higher traverse speed or return speed.

Speed control levers 80 and 81 are pivotally mounted on the gear box 8. Lever 80 has three higher speed control positions (FIG. 10). Shaft 82 pinned to the lever 80 is provided fixedly with a gear shifter 83 which serves to carry out the above mentioned three-step gear change as conventionally. This speed control gear is rather conventional and does not constitute any part of the invention. Thus, therefore, more detailed description of this speed change mechanism has been omitted from the specification. As may be well supposed, control lever 81 provides possibilities for changing gear ratio in the similar way for two lower speed control stages.

A control lever 36 for power feed of turret ram through drive shaft 22 is fixedly attached to a pin 37 by means of a suitable fixing means such as a fixing screw 38 and the pin has screw threads received in the correspondingly tapped bore of an attaching piece assembly generally denoted by 39, said assembly being detachably bolted to gear casing 8 as shown in FIG. 2A. There is a pressure disc 40 between the tip end of screw pin 37 and bearing 18. In the similar way, there is arranged a ring 43 between bearing 18 and clutch member 16 (FIG. 2A). For the actuation of control lever 36, a solenoid assembly 41 is fixedly mounted on gear casing 8, as shown in FIGS. 1B and 10, and the armature rod 42 of the solenoid is pivoted to one end of the control lever. When the solenoid is energized as in a more fully hereinafter described manner so as to turn the lever clockwise in these figures, the pivot pin 37 is equally turned and advanced a small distance in the right-hand direction in FIG. 2a on account of the screw engagement with the stationary assembly 39, whereby an urging force is transmitted from the pin through pressure disc 40, bearing 18 and ring 43 to clutch member 16 so that the latter is urged in the right-hand direction until it is brought into engagement with the clutch member 20.

In this operating position of control lever 36, the latter is held in its working position by the engagement with a stop lever 44 which is pivotably mounted on the front wall of gear box 8, as shown in FIGS. 1 and 10.

When stop lever 44 is turned about its pivot pin 45 counter-clockwise, control lever 36 is released and rotated by gravity action in the same direction automatically, whereby screw pin 37 is caused to return to its original position and thus the clutch members 16 and 20 are caused to separate from each other by spring action. By the above-mentioned turning movement of stop lever 44, a microswitch 46 mounted on gear casing 8 is opened for the purpose to be disclosed hereinafter.

Lateral shaft 7 is fitted at its free end with an electromagnetic clutch 29 which cooperates with a gear train 30–33 contained in a gear box 34 fixedly mounted on ram 10. An electric motor 35, preferably a reversible, pole-change motor, is mounted as shown in FIG. 11 on the gear box 34 (FIG. 11).

Figure 3:
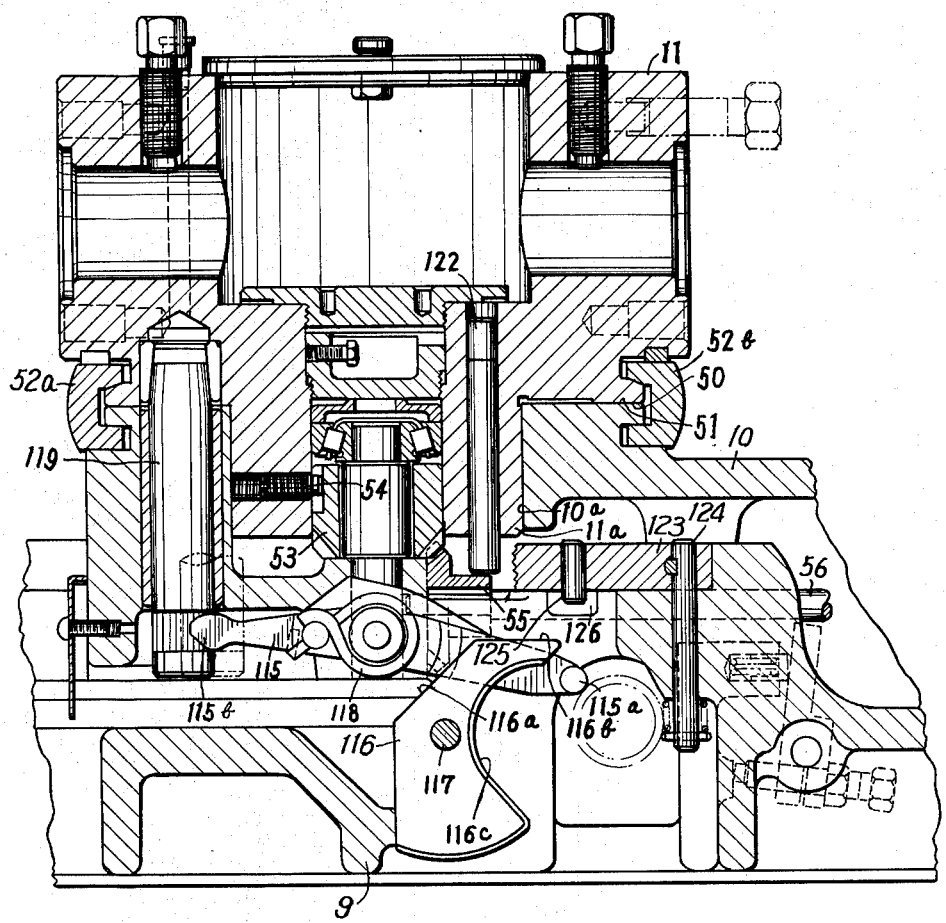
FIG. 3 is a detailed vertical section of the turret head assembly of the machine drawn to the same scale as in FIG. 2.

Turret head 11 is of the conventional hexagonal design and formed with a cylinder skirt 11a, FIG. 3, which is rotatably received in the correspondingly shaped opening 10a of ram 10 as is conventional. Across the cooperating bearing surfaces 50 and 51 on ram 10 and head 11, respectively, there is provided a two-part brake ring or band 52a and 52b. When this ring is tightened, the two members 10–11 are united into one piece so as to move in unison. The both band elements are substantially rigidly, yet somewhat resiliently connected together by means of bolt-and-nut connection shown in FIG. 6, on the one hand, and releasably connected by means of a shifter mechanism shown in FIG. 5, on the other hand, as will be described more fully hereinafter. On the contrary, when the ring is loosed, the turret head 11 may be rotated independently from the ram, as will be described hereinbelow. A hollow bevel pinion 53 is fixed concentrically in the central bore of turret skirt 11a by means of a set screw 54, which pinion meshes with bevel gear 55. Gear 55 is keyed to an elongated transmission rod 56 carrying on its opposite end a collar 47 (FIG. 7) which adjustably mounts six stop screws denoted by 48a–48f. It will be seen that rotary movement is synchronously transmitted to the collar 47 which is rotatably mounted on the outboard end 9a of saddle 9.

In the present machine, the collar 47 is provided fixedly with a perforated gear 49 as shown which is kept in engagement with a gear 57, the latter being of similar size and having similar teeth thereon as the former or driving gear teeth 49. Stop screws 48a–48f pass loosely through gear 49. Gear 57 is fixedly mounted on the inward end of a rotatable positioning elongated cylinder 58 which is preferably made into a hexagonal pyramid in this case and provided with six parallel elongated longitudinal grooves generally denoted by numeral 59a–59f. The positioning cylinder is rotatably mounted at its one end by a stationary arm 60 depending from saddle end 9a, and at its opposite end by a rigid arm 61 projecting equally from the saddle end 9a. Thus, it will be clear that a positioner groove 59a or the like corresponds to each tool station A or the like of the turret head. Six set screws 62 pass through collar 47 for adjustable positioning each of the stop screws 48a–48f as is conventional. Positioning grooves 59a–59f are provided with dogs 63a–63f in one-to-one relation therewith and a microswitch 64 is mounted on a further arm 65 projecting from gear box 8 as shown in FIG. 1B, for cooperation with the occasionally working dog 63 as is to be described.

A star wheel 66 having six radial projections 67–72 is fixedly mounted on positioning cylinder 58 near its outboard end and a microswitch 73 is mounted on arm 61 for cooperation with wheel 66.

A further dog 84 is positioned selectively along the final control groove 59f on cylinder 58, which dog cooperates at a desired time point with a switch 85 fixedly mounted on arm 61.

The operation of the turret above described will be set forth hereinbelow with additional reference to the circuit diagram shown in FIG. 12.

First, chuck a stock 74 to be machined on the chuck 3 by means of conventional jaws 4 as shown in FIG. 1A, and set up necessary tools on all stations of the turret head A, B, C, D, E and F as shown in FIG. 1B, wherein however only one of such tools 75 is illustrated by way of example. Then, adjust and fix all stop screws 48 as is conventional so as to preselect the necessary cutting feed length for each of the turret stations A–F. For this purpose, the stop screw is advanced to a desired position by manual turning and when it is brought to the desired position, the related set screw 62 is tightened. Next, select a proper spindle speed. For this purpose, selection handle 100 is pulled forwardly and turned in one direction or the other, until an indicator mark 101 points precisely to a selected numeral on stationady disc 102 fixedly mounted on spindle head 2. When released, the handle 100 will be held in position by spring action as is conventional, although not illustrated for simplicity. A proper ram traversing speed is selected by manipulating control lever 80 or 81, as the case may be, in the manner explained hereinbefore.

Then, the terminating point of quick traversing movement of the ram, or the initial point of the cutting feed for each of the turret tools is determined as follows: The ram is advanced manually by turning the star handle clockwise in FIG. 1B or 10. Normally, stop lever 36 is positioned by gravity action in its off-service position as denoted by dash lines 36a in FIG. 10, so that the clutch members 16 and 20 are kept disengaged from each other. When the tool 75 is brought to a position in proximity to the work, the rotational movement of the star handle is stopped and the corresponding dog 63a is adjusted in its position so as to bring it into contact with the cooperating switch 64. This procedure is continued and repeated until all of these dogs 63a–63f have been preset as desired.

Next, dog 84 is adjusted in its position so that it may operate upon switch 85 at a suitable time point between the completion of cutting operation at the final or sixth tool station F and the completion of indexing movement of the turret head to the initial or first station A thereof. Then, a manual switch 103 of switch box 76 is manipulated from "Manual" to "Automatic" position, 200 of the auxiliary circuit in FIG. 12 is energized so that line 201 including autotransformer TR is also energized, whereby rectifier SE operates, and a D.C. voltage is impressed between terminals P and Q.

Whereupon, a further selector manual switch 105 on switch box 76 is transferred manually from "Individual" to "Cyclic."

A starting switch 99 on spindle head 2 is manipulated to start the spindle motor the electric circuit for this motor is not shown). Thus, motion is transmitted therefrom through spindle gearing to drive shaft 22.

Further, a further starting switch 104 is depressed, whereby line 202 including relay coil CM1 is energized and one of the relay contacts cm1–b is closed so as to self-maintain the relay coil. At the same time relay contacts cm1–b in line 199 of the auxiliary circuit, and three relay contacts cm1–c, cm1–d, cm1–e in the main circuit are closed and thus terminals U, V and W of motor 35 are energized, whereby the latter is brought into forward rotation at a high speed. Upon closure of contact cm1–a, line 203 including clutch coil or solenoid MC and a condenser CO arranged parallel thereto is energized. The condenser serves as a protective condenser for the main circuit. By the energization of line 203 and thus of the coil MC of clutch 29, the clutch is engaged. Thus, rotation is transmitted from the motor 35 through clutch 29 and shaft 7 to the star handle, whereby a quick traverse motion of the ram and the turret head carried thereon is caused to take place by the engagement of pinion 12 with rack 13. At the end of this forward movement of the ram, a dog 63a allotted to the first tool station A is brought into engagement with switch 64 so as to open the latter; whereby the aforementioned lines 202 and 203 are deenergized and a line 204 including solenoid 41 is energized so that the stem 42 (FIG. 10) is caused to move upwards and thus the feed lever 36 is caused to turn clockwise to its operative position shown. This operative position is mechanically held by the engagement with stop lever 44, which is urged to turn clockwise in the drawing about its pivot 45 a small angle under the influence of the spring-loaded push button 46a of switch 46. The lower end of lever 44 is formed with a shoulder for attaining easy and positive engagement with the tip end of lever 36.

By the engagement of feed lever 36 with stop lever 44, push button switch 46a is depressed, line 205 including relay coil CR1 is thereby opened and line 206 including relay coil CR2 is closed. By the energization of this coil, relay contact cr2–a is closed so that line 207 including relay coil CR3 is energized. By energization of relay coil CR1, its contact cr1–a is opened so as to de-energize feed solenoid circuit 204. However, the feed lever 36 is kept in its operative position thanks to the mechanical engagement with stop lever 44. With the feed lever brought to its operative position, the tool 75 on the first turret station A is fed at a slower or cutting speed as is conventional. When the cutting operation comes to its predetermined terminating point, the corresponding stop screw 48a to the first turret station operates as conventionally and releases stop lever 44 from the aforementioned engagement. Feed lever 36 is thus turned counter-clockwisely by gravity action and thus brought to its off-service position. Push button switch 46a returns to its initial position by spring action, not shown.

Figure 5:
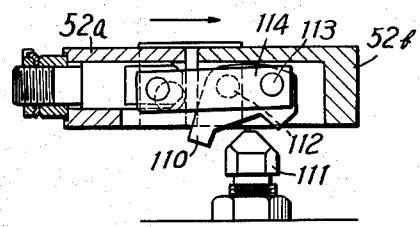
FIG. 5 is a detail vertical section of a fixing and releasing mechanism employed for turret head halves.

By this return operation of switch 46a, line 206 including relay coil CR2 is opened. When the relay CR2 is deenergized, line 205 is again energized by closing relay contact cr2–d, whereby relay coil CR1 is energized. In this case, line 207 including relay coil CR3 is also active as already described hereinbefore. By the energization of the both coils CR1 and CR3, line 208 including relay contacts cr1–b and cr2–c thus closed is energized for actuation of relay coil CM2, whereby contacts cm2–b, cm2–c and cm2–d thereof arranged in the main circuit for motor 35 are energized so as to rotate the latter in the reverse direction at a quick return speed. Simultaneously, relay contact cm2–a in the clutch circuit 203 is closed so that the clutch 29 is reengaged. It will thus be clear that reverse rotation is transmitted from motor 35, gearing 30–33, clutch 29 and shaft 7 to ram 10 so as to return the latter at a predetermined quick return speed. At a proper point nearer to the end of the ram return movement, a pivotable follower 110 mounted on the turret ram is brought into engagement with a pyramid bolt 111 fixedly mounted on the lathe saddle 9 (FIG. 5). The direction of return movement of the ram is shown by an arrow in FIG. 5, and thus, it will be clear that by this engagement the follower is caused to turn clockwise in the drawing about its pivot 112 and the common pivot pin 113 passing through follower 110 and shifter 114 is shifted downwardly and outwardly, whereby one of tightening band elements 52a which is tightened by a bolt-and-nut fixing device hinged to the opposite end of the shifter is loosened from the opposite and cooperating band element 52b so as to release the upper half of the turret head from the lower half as is conventional. With further return movement of the ram, the right-hand end projection 115a of lever 115 (FIG. 3) rides against the inclined surface 116a of cam 116 and thus, the lever is turned counter-clockwise about its pivot pin 117 on saddle 9 against spring action 118 so that the left-hand or operating end 115b of the lever acts by the tongue-and-groove connection as shown upon a positioning pin 119 and the latter is thereby lowered and disengaged from the upper half of turret head, which is thus completely released from the lower half and ready for being indexed.

At a preselected proper time point before the commencement of the indexing of the turret, dog 120 is brought into engagement with switch 121 so that line 208 is opened and relay coil CM2 is deenergized, whereby relay contact cm2–a is opened so as to disengage clutch 29. Simultaneously, relay contact cm2–e in line 208 is closed and relay coil CM3 is energized. With the coil CM3 energized, contact cm3–e is closed so as to self-maintain the relay circuit 208, on the one hand, and three relay contacts cm3–b, cm3–c and cm3–d in the main circuit for motor 35 are closed, on the other hand, so that the turret ram 10 continues its return movement at a considerably reduced speed provided from the thus energized motor and adapted to the indexing operation of turret head. This reduced speed is selected to be one third the normal return speed of the ram, as an example. When the ram continues to return still a small distance one of six dividing pins 122 is brought into contact with the recessed tip end of indexing lever 123 which is then caused to pivot counter-clockwise in FIG. 4 about its pivot 124, because any clockwise rotation of the lever is positively prevented by the engagement of a depending stop pin 125 from the lever with a recess 126 formed in the saddle. By this turning movement of the indexing pin, the upper turret head half fixedly attached therewith is caused to partially rotate in unison to the second tool station B, thus completing the indexing stage. This partial rotational movement of the upper turret half is transmitted from the lower bevel pinion 53 to bevel gear 55 which is fixedly attached to one end of an elongated transmission shaft 56 mounted rotatably in the ram, although the bearing means are not shown for simplicity of the drawing. Motion of shaft 56 is transmitted through collar 47, gears 49 and 57, cylinder 58 to star wheel 66. Thus, this star wheel rotates in unison with the rotary indexing movement of the upper turret head half. At a proper time in the course of the indexing movement, the star wheel operates upon switch 73, whereby the latter is shifted from its position shown by full line to the opposite position shown by dotted line, so as to close line 209 including relay coil CR4, its contact cr4–b in line 210 is closed so that relay coil CR5 is energized and self-maintained by closing its contact cr5–c, because the selective switch 105 included in the line has been closed as already referred to. With the relay CR5 energized, its contact cr5–b in line 207 is opened so as to deenergize the latter. Simultaneously with completion of the above mentioned indexing stage, switch 73 is shifted again to its original position, whereby line 209 including relay CR4 is opened. By the deenergization of relay CR4, its contacts cr4–a and cr4–c are opened, while contact cr4–b is closed, so as to energize line 10 including relay CR5, which is thus energized. By the energization of relay CR5, its contacts cr5–a and cr3–c are closed, while contact cr5–b is opened. By the deenergization of relay CR3 in line 207, its contacts cr3–a and cr3–b are closed and contacts cr3–c and cr3–d are opened. By the closure of both contacts cr3–b and cr5–a, line 202 including relay CM1 is again energized, so that a new quick traverse motion of the ram is initiated with the second tool station B divided to its operative position as above explained.

In the main circuit, there are several heating elements TH1, TH2 and the like. When overcurrent should flow through the main circuit, one or more of these elements are heated and act to release thermal relays th1 and th2 and the like in line 202 of the auxiliary circuit.

When the indexing stage has been completed, the tip end projection 115a of follower lever 115 passes over the horizontal surface 116b of cam 116 and swivels clockwise to the position shown in FIG. 3, so that positioning pin 119 is pushed upwards so as to engage with the upper turret head half under the influence of urging spring 118. The aforementioned reinitiation of quick traverse motion of the ram is carried into effect upon completion of this mechanical reengagement.

During the quick traverse movement of the turret ram, the lateral projection 115a on follower lever is brought into contact with the curved recess 116c of the cam and the latter is thereby caused to turn counter-clockwise in FIG. 3 about its pivot pin so that the lever 115 can pass over the cam without hindrance. The thus released cam 116 will return to its operative position shown by gravity action, because the lower part thereof is considerably thickened and thus increased in its weight.

With further advancing movement of the ram, pivotable lever 110 is brought into collision against pyramid bolt 111 and thus rotated counter-clockwise about its pivot pin 112 in FIG. 5, whereby shifter 114 is moved in the same direction so as to tighten the band elements 52a–52b together and to unite the both upper and lower halves of the turret head assembly together. In this way, the turret is clamped tightly to the traversing ram. Then, the aforementioned quick traversing and cutting operation is repeated, yet with use of the second tool station B.

The above mentioned stroke of the turret is repeated until all the tool stations have been indexed and operated in a successive order.

After all six tool stations have been served, a dog 84 on cylinder 58 operates upon switch 85 so as to close and thus to energize line 212 including relay coil CR6. By the energization of relay CR6, its contacts cr6–a and cr6–b are opened so that lines 207 and 210 are opened, while contact cr6–c is closed so that the relay CR6 is maintained. Relay CR5 is thus deenergized and its contact cr5–a is opened so that relay CM1 in line 202 is also deenergized so that contacts cm1–b, cm1–c and cm1–d in the main circuit are disconnected. It will be clear that in this case no traverse motion of the ram can be initiated so that a complete cycle of operation has been performed.

Instead of a complete cycle including six tool stations, it may be desired by way of example to operate only three successive stations. In this case, the dog 84 is preset so that it may trip the switch 85 at a proper point in the course of the indexing operation for the fourth tool station D. With use of such newly adopted presetting, the switch 85 is tripped after completing four successive cutting operations so that the desired shortened operation cycle may be attained.

If one stage operation only is required, a selector switch 105 is transferred to "Individual" so the line 213 including relay coil CR7 is ready for being energized. When switch 73 is actuated as referred to hereinbefore at a proper time in the course of the next turret dividing operation, relay CR4 in line 209 is energized and its contact cr4–d in line 213 is closed so that the latter is energized. With energization of relay CR7, its contact cr7 in line 207 is opened and thus relay CR3 is deenergized. Relay CR5 is also deenergized by the switch 105 transferred in the aforementioned way. Relay contact cr5–a is thus kept open so that relay CM1 and power contacts cm1–b, cm1–c and cm1–d are interrupted. Thus, further traverse movement of the turret ram can not take place. It will thus be understood that in this case one stage operation only is carried into effect and further cutting operation ceases.

Various modified machine operations can be easily understood by those skilled in the art from the foregoing.

While the form of machine herein described constitutes a preferred embodiment of the invention, it is to be understood that the invention is not limited to this precise form of machine, and that changes may be made therein without departing from the scope of the invention which is defined in the appended claim.

What is claimed is:

In a lathe a headstock, a ram, an indexible turret carried by the ram, a rack secured to the ram, a pinion in driving engagement with the rack and means for driving the pinion in opposite directions to drive the ram toward and away from the headstock, said means comprising a shaft, a handwheel secured to the shaft at one end, an electromagentic clutch secured to the shaft at the other end and a gear fixed to the shaft intermediate said ends; a reversible electric motor and a gear train driven thereby at said other end for driving connection to the shaft by said electromagnetic clutch; a gear train including a clutch having an axially movable member connected to said gear for connecting said gear to a power source and means for axially moving the member into clutching engagement, said means comprising a threaded pivot connected to said axially movable member, an arm fixedly mounted on the pivot, and a solenoid connected to the arm for rotating the arm against the force of gravity when the solenoid is energized; means for locking the arm in clutch engaging position when the solenoid is deenergized, means to release the locking means at a predetermined position of the turret in relation to the headstock to allow the arm to drop to clutch releasing position, switch means for energizing and deenergizing the solenoid, electromagnetic clutch, and reversible motor, and means responsive to the position of the ram and the angular position of the turret for operating the switch means in predetermined sequence.

References Cited by the Examiner

UNITED STATES PATENTS

| | | | |
|---|---|---|---|
| 820,122 | 5/1906 | Morrice et al. | 192—97 |
| 1,772,182 | 8/1930 | Huber | 192—97 |
| 2,056,792 | 10/1936 | Lovely | 82—26 X |
| 2,094,993 | 10/1937 | Lovely et al. | 29—46 |
| 2,592,920 | 4/1952 | Lovely et al. | 29—46 |

WILLIAM W. DYER, Jr., *Primary Examiner.*